United States Patent
Shaffer et al.

[11] Patent Number: 5,960,001
[45] Date of Patent: Sep. 28, 1999

[54] APPARATUS AND METHOD FOR GUARANTEEING ISOCHRONOUS DATA FLOW ON A CSMA/CD NETWORK

[75] Inventors: Shmuel Shaffer, Palo Alto; William J. Beyda, Cupertino, both of Calif.

[73] Assignee: Siemens Information and Communication Networks, Inc., Boca Raton, Fla.

[21] Appl. No.: 08/878,522

[22] Filed: Jun. 19, 1997

[51] Int. Cl.$^6$ .................................................. H04L 12/413
[52] U.S. Cl. ........................... 370/448; 370/443; 370/459
[58] Field of Search ..................... 370/448, 447, 370/445, 443, 442, 439, 450, 451, 468, 347, 349, 337, 338, 404, 498, 352, 326, 329, 341, 458, 459

[56] References Cited

U.S. PATENT DOCUMENTS

| | | | |
|---|---|---|---|
| 4,549,292 | 10/1985 | Isaman et al. | 370/424 |
| 4,637,014 | 1/1987 | Bell et al. | 370/449 |
| 4,858,232 | 8/1989 | Diaz et al. | 370/465 |
| 5,329,531 | 7/1994 | Diepstraten et al. | 370/347 |
| 5,406,559 | 4/1995 | Edem et al. | 370/516 |
| 5,440,556 | 8/1995 | Edem et al. | 370/509 |
| 5,450,411 | 9/1995 | Heil | 370/352 |
| 5,521,928 | 5/1996 | Worsley et al. | 370/362 |
| 5,570,355 | 10/1996 | Dail et al. | 370/352 |
| 5,594,732 | 1/1997 | Bell et al. | 370/401 |
| 5,761,430 | 6/1998 | Gross et al. | 395/200.55 |
| 5,805,597 | 9/1998 | Edem | 370/445 |

*Primary Examiner*—Dang Ton
*Assistant Examiner*—Phirin Sam

[57] ABSTRACT

A contention protocol permitting transmission of isochronous data. A device (104) wishing to transmit isochronous data can reserve periodic time slots for the transmission. Either the device (104) or a network controller (101) transmits the reservation information to other devices (106, 108) on the network. When non-isochronous transmissions are desired, the devices (104, 106, 108) contend for access using the CSMA/CD protocols, but taking into account the already reserved time slots. For example, the reserved period may be added to the randomly chosen backoff window. Alternatively, if a backoff window expires during a reserved period, the backoff window may be restarted upon completion of the reserved period. If not all the devices (104, 106, 108) on the network employ this modified CSMA/CD protocol, a "dummy" frame is provided at the beginning of each isochronous transmission. If another device is contending for access, the dummy frame collides, and the other device backs off. The isochronous transmission then proceeds.

20 Claims, 5 Drawing Sheets

APPARATUS AND METHOD FOR GUARANTEEING ISOCHRONOUS DATA FLOW ON A CSMA/CD NETWORK

BACKGROUND OF THE INVENTION

This invention relates to a network access protocol known as carrier sense multiple access with collision detection (CSMA/CD) and, more particularly, to a method for allowing isochronous data flow on such a network.

The CSMA/CD protocol generally used in Ethernet LANs (local area networks), is defined in ANSI/IEEE standard 802.3, published by the Institute of Electrical and Electronics Engineers (hereinafter the "IEEE 802.3 standard"). Under the CSMA/CD rules for access to a network bus or cable, any node or station wishing to transmit must first listen to ensure that the channel is clear before beginning to transmit. All nodes on the network have equal priority of access and may begin transmitting as soon as the channel is clear and a required interpacket delay of 9.6 microseconds has elapsed. However, if a first node that has begun transmitting detects a collision with a transmission from another node, the first node continues transmitting for a short time to make sure that all nodes wishing to transmit will detect the collision (it is assumed that, while the attempts to transmit are nearly simultaneous, the first node is actually the first to begin). Every other node detecting the collision also continues to transmit for a short time. Then each node that has detected a collision terminates transmission of the packet or frame. The nodes involved in the collision then wait for a required interpacket delay of 9.6 microseconds and then select random and therefore usually different delay times, referred to as backoff times, before attempting to transmit their packets again. The IEEE 802.3 standard defines a collision backoff procedure referred to as "truncated binary exponential backoff." When a transmission attempt has terminated due to a collision, it is retried by the transmitting node after a selected backoff time until either the transmission is successful or a maximum number of attempts have been made and all have been terminated due to collisions. The backoff time is selected by each node as an integral multiple of the "slot time" which is the maximum round trip propagation time for the network, i.e., the time required to propagate a data packet from one end of the network to another. The slot time is defined by the IEEE 802.3 standard as 51.2 microseconds. The number of slot times selected as the backoff time before the nth retransmission is chosen as a randomly distributed integer R in the range: $0 \leq R \leq 2^k$, where k=min (n, 10).

As can be appreciated, a CSMA/CD network according to the IEEE 802.3 protocol makes no provision for traffic priority. While generally adequate for transmitting packetized burst-type data such as E-mail or word processing documents, real-time or isochronous traffic is put at risk of being blocked. isochronous data such as voice or video requires a guaranteed bandwidth and tightly bounded delivery delays. As can be appreciated it is becoming increasingly desirable to provide both isochronous and non-isochronous transmission on a single local area network.

One approach to providing for isochronous data transmission on a local area network is isochronous Ethernet ("isoEthernet") or IEEE standard 802.9a. isoEthernet is a hybrid network that combines standard 10 megabit per second Ethernet with 6.144 megabits per second of isochronous bandwidth for a total of 16 megabits per second available to any user. The isochronous portion is further divided into 96 separate 64 kbps ISDN bearer or B channels. While providing backward compatibility and the ability to be introduced piecemeal, isochronous Ethernet requires channels separate from the existing CSMA/CD data path in order to provide for isochronous data flow. This results in a relatively higher and undesirable level of complexity.

Accordingly, it is desirable to provide a system and method for guaranteeing isochronous data flow within an existing CSMA/CD data path.

SUMMARY OF THE INVENTION

These problems in the prior art are overcome in large part by a system and method according to the present invention. More particularly, a network is provided in which isochronous traffic is transmitted on reserved time slots, whereas non-isochronous traffic contends for non-reserved slots according to a particular contention protocol.

According to one embodiment of the invention, a modified CSMA/CD protocol is employed. A device wishing to transmit isochronous data can reserve periodic time slots for the transmission. Either the device or a network controller transmits the reservation information to other devices on the network. When non-isochronous transmissions are desired, the devices contend for access using the CSMA/CD protocols, but taking into account the already reserved time slots. For example, the randomly chosen backoff window period may be added to a remaining period for the reserved period. Alternatively, if a backoff window expires during a reserved period, the backoff window may be restarted upon completion of the reserved period.

If not all the devices on the network employ this modified CSMA/CD protocol, a "dummy" frame is provided at the beginning of each isochronous transmission. If another device is contending for access, the dummy frame collides, and the other device backs off. The isochronous transmission then proceeds.

BRIEF DESCRIPTION OF THE DRAWINGS

A better understanding of the present invention is obtained when the following detailed description is considered in conjunction with the following drawings in which.

DETAILED DESCRIPTION OF THE INVENTION

Figure 1A:
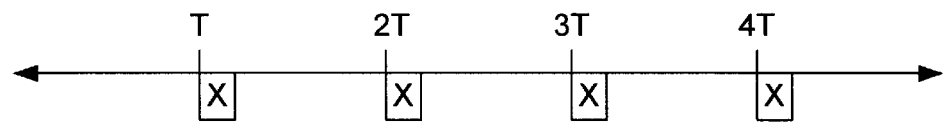
FIGS. 1a–1c are diagrams illustrating contention protocols according to an embodiment of the present invention.

Turning now to the drawings, and with particular attention to FIG. 1a, reserved time slots X for an isochronous channel are illustrated. For example, a 10 megabit per second Ethernet network has a maximum of 1500 bytes per frame, though smaller frame sizes may be used. If user X requests a reservation for a voice channel of 64 kilobits per second, the message is divided into one byte samples, which results in 8,000 bytes (samples) per second. If an Ethernet frame size of 800 bytes is chosen (the number is arbitrary), one isochronous frame will be required to be sent every 100 msec, which allows a handling delay (i.e., the time required to build the data into the frames) of no more than 100 msec, as well.

With a required isochronous time interval T=100 msec, network allocation must also be considered. Each frame contains 800 bytes, and thus there are 6400 bits per frame. If sent at a speed of 10 megabits per second (which is regular Ethernet; high speed Ethernet (100 Mbps) may be employed, as well), each frame is transmitted in 0.64 msec, which is represented in FIG. 1a as X (figure is not to scale). If the maximum Ethernet frame size were used, it would require about 1.2 msec to send the frame. The reservation request therefore may include the bandwidth (i.e., 64 kilobits per second), the arrival rate (100 milliseconds), the traffic type (voice) and the frame length P, for example 800 bytes.

The reservation server or the on-board controller determines that no other node or network device has yet placed a reservation, and allocates enough of the 10 million time slots per second to service the request. For example, at 800 bytes per frame at 8 bits per byte, 6400 time slots (each one bit wide) are required to be assigned to the channel for user X in a first 100 millisecond time period. In the next 100 millisecond time period, another 6400 time slots are assigned and so on. The reservation server or the local controller sends a message to the other nodes that the channel X is opened starting in a particular time slot and having a particular duration recurring at a particular periodic rate.

Each network node maintains a record of this reservation chart. If a particular node needs to send a data message according to normal Ethernet protocols, that node knows that the time slots marked by the X in FIG. 1a are already reserved, but it can contend for any of the free time not so marked. If no other node transmits during this time, the node can send a message. If, however, data from the node collides with data from another node, the nodes resolve the collision using standard Ethernet protocols, with the exception that they will not transmit during the time already allocated. If a non-isochronous transmission cannot be completed prior to the beginning of the next reserved period, the non-isochronous transmission will not be allowed to occur. If a backoff window expires during a reserved time period X, the backoff window may be re-started upon expiration of the reserved period. Alternatively, the reserved period remaining may be added to the expired backoff window period. When the isochronous call is completed, the originating node transmits a message to the reservation server and a broadcast message is sent from the reservation server indicating that the space is again available.

Figure 1B:

FIG. 1B illustrates the case in which another node has made a request for and reserved periodic time slots. For example, user Y may require video bandwidth of 128 kilobits per second. The reservation server then reserves the time slots and transmits this control information to the other nodes as discussed above.

Figure 1C:
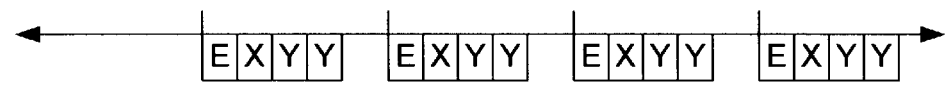

In order to prevent users equipped only with legacy network interface cards from attempting to transmit data during a initiation period for a reserved time slot, the network users of the reservation protocol described above transmit a "dummy" frame at the beginning of their transmission. The only purpose of the dummy Ethernet frame is to begin the use of the network. Thus, if someone else begins transmitting, the dummy frame E in FIG. 1c collides with it and stops the transmission. Since the X and Y frames are transmitted immediately behind the dummy frame, and the legacy devices are following standard CSMA/CD protocols, the legacy devices won't see the required interframe gap and will not try to retransmit until after the X and Y frames are complete thereby forcing the legacy devices into the open times. If a reserved period is scheduled to begin during the non-isochronous transmission of a legacy device, the dummy frame will collide and force the legacy device data off the bus.

It is noted that, while each reserved slot is illustrated at the beginnings of frames, they may be configured to occur at other times within the frames. Similarly, the reserved portions may have either a fixed length or a dynamically variable and/or user-configurable length.

Figure 2:
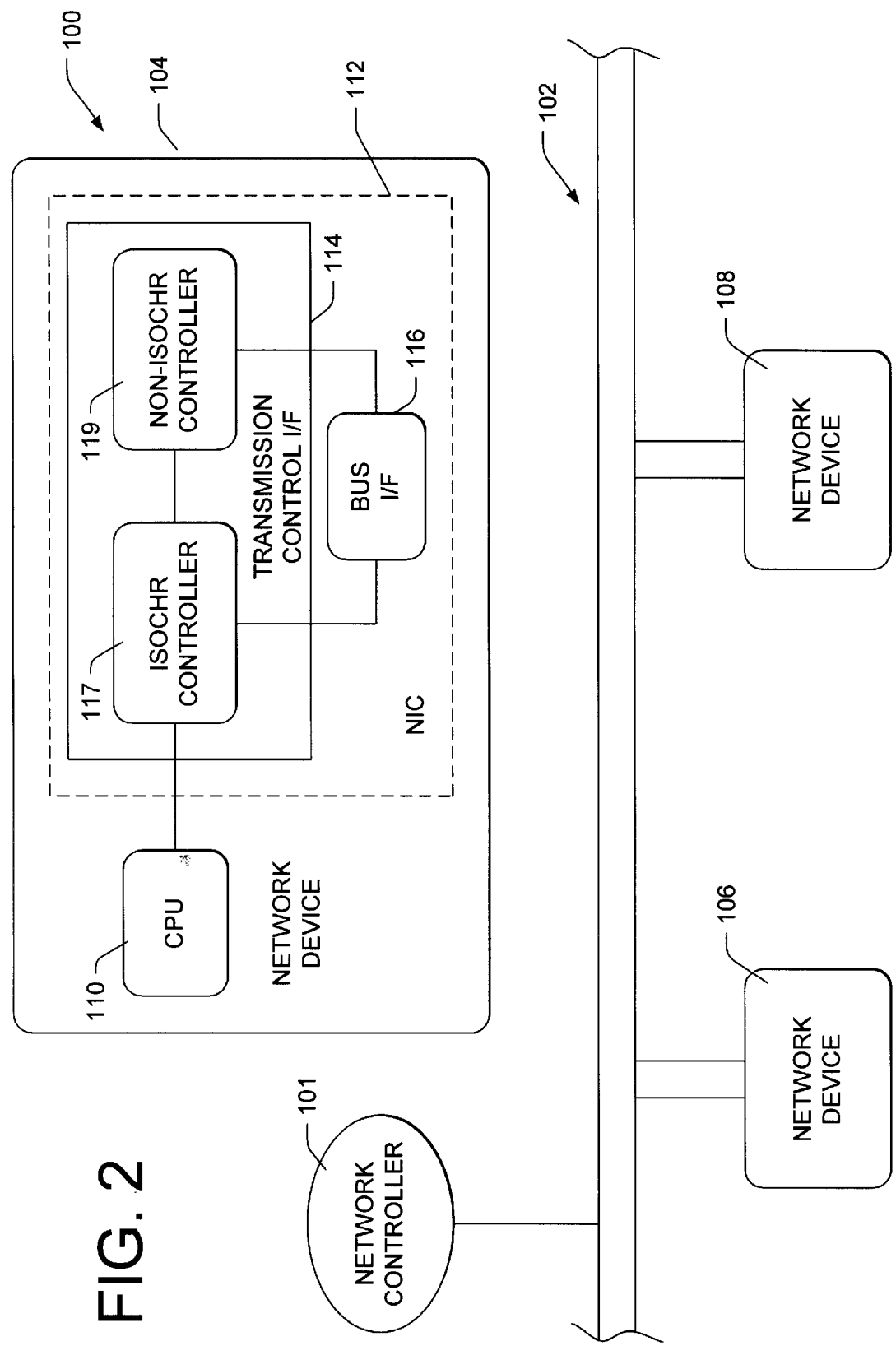
FIG. 2 is a block diagram illustrating a network system according to one embodiment of the present invention.

Turning now to FIG. 2, a network system 100 employing an embodiment of the present invention is illustrated. The network system 100 includes a plurality of network devices 104, 106, 108 coupled to a transmission medium or bus 102. The bus 102 may be, for example, coaxial cable or 10 base T unshielded twisted pair wiring. The network devices 104, 106, 108 are exemplary of personal computers, printers, servers or other devices. A network controller 101 may also be provided. The network controller 101 is configured to reserve and record the time slots for isochronous transmissions. In an alternate embodiment, the network controller may be embodied in an isochronous controller on-board one of the network devices.

The invention will be described with respect to exemplary device 104. While each network device 104, 106, 108 in the network 100 may be similarly configured, the present invention is operable if only one node is so configured. The network device 104 includes an exemplary network interface card 112 coupled to a central processing unit 110. The central processing unit 110 is exemplary of a Pentium or Pentium Pro type processor in a personal computer. The network device 104 may include a plurality of peripheral devices such as video cameras, modems and the like.

The network interface card 112 includes a transmission control interface 114 including an isochronous controller 117 coupled to a non-isochronous controller 119. Isochronous controller 117 and non-isochronous controller 119 in turn are coupled by a bus interface 116 to bus 102. The bus interface 116 includes I/O drivers and circuitry to monitor activity on bus 102. Non-isochronous controller 116 is preferably a controller for a CSMA/CD network protocol.

Figure 3:
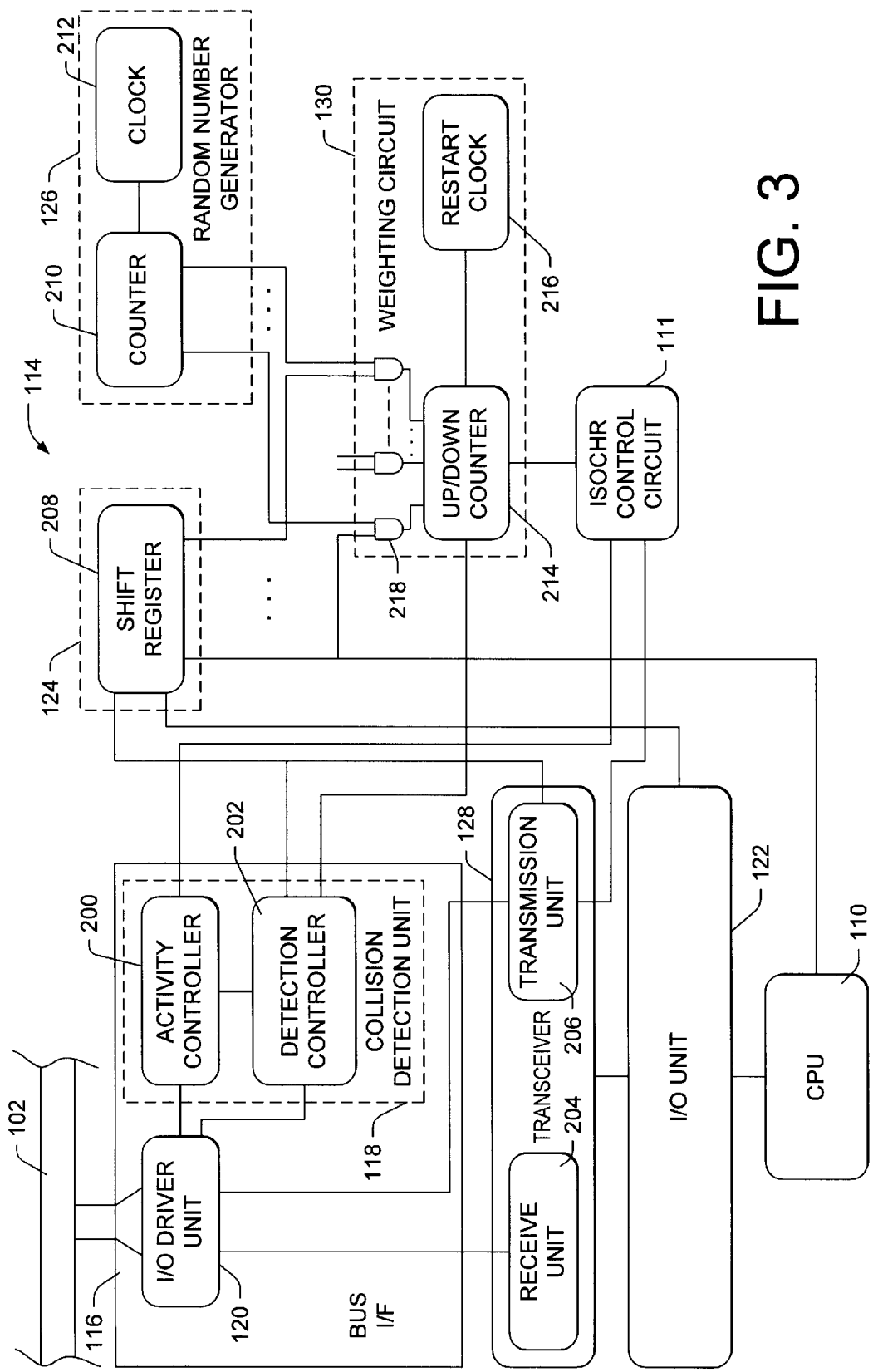
FIG. 3 is a more detailed block diagram illustrating a network device in the network system of FIG. 2.

Operation of one embodiment of the present invention is illustrated in FIG. 3. FIG. 3 illustrates in greater detail the components of the network interface card 112. It is noted that while illustrated as discrete hardware, the bus interface 116 and the transmission control interface 114 may be embodied in one or more digital signal processors (DSPs). Thus, FIG. 2 and FIG. 3 are exemplary only.

As illustrated in FIG. 3, the bus interface 116 includes an I/O driver unit 120 coupled to a collision detection unit 118. The I/O driver unit 120 drives data to and receives data from the bus 102. The collision detection unit 118 includes an activity controller 200 coupled to a detection controller 202. The activity controller 200 is used to identify isochronous data on the bus and control the CSMA/CD protocol system based thereon. More particularly, the activity controller 200 receives information either from a network controller 101 or other network devices that isochronous transmissions are occurring at particular times. If an isochronous transmission on the bus has just terminated, the network device may wish to transmit nonisochronous data. If the network device's attempt to seize the bus causes a collision with data frames from another network device, the devices will enter into the CSMA/CD protocol described above. However, running of the backoff times will be suspended or halted during time periods corresponding to the next transmission of the isochronous data. That is, if a backoff window is set to expire during an isochronous transmission, the backoff window will be automatically extended to the end of the isochronous transmission. So that not all backoff windows expire at the end of the isochronous transmission, an additional randomly chosen backoff period may be added to the end of the isochronous transmission for those devices contending for nonisochronous access to the bus. For example, the backoff timer may be set to reset upon expiration of the isochronous window. Alternatively, the backoff window may be extended by the isochronous time remaining.

If a collision is detected during a transmission attempt, the activity controller 200 provides an output to the control unit 202 and isochronous control unit 111 indicative of the presence or absence of isochronous transmissions on the bus. The detection control unit 202 then suspends transmission along the transmission medium 108 and provides a control signal to the collision counter 124. The collision counter 124 includes, for example, a shift register 208. The shift register 208 may be configured to shift every time a collision is detected.

The shift control signal is also provided to a transmission controller 206 in the transceiver 128. The transceiver 128 includes a receive unit 204, in addition to the transmission unit 206. Data are received from the CPU 110 through the I/O unit 122 and on to the transceiver 128. The data are the provided to the I/O drivers 120 and out onto the transmission medium 108.

Returning now to the case where the detection control unit 202 has provided a shift control signal to the shift register 208. The shift register 208 provides outputs to a series of AND gates 218. The other inputs to the AND Gates 218 are derived from the random number generator 126. More particularly, the random number generator 126 includes a counter 210 and a clock 212. The clock 212 is a faster clock than the system clock. The counter 210 runs as a continually running clock counter. The AND gates 218 comprise a portion of the weighting circuit 130. The weighting circuit 130 further includes an up/down counter 214 coupled to a restart clock 216. As noted above, the shift register 208 is clocked each time a collision occurs and the serial input thereof is, in turn, provided to count up the number of collisions occurring during those times when a frame is ready for transmission.

The outputs of the AND Gates 218 are connected to the inputs of the up/down counter 214, which is clocked by the restart clock 216. The up/down counter 214 is loaded by the collision detection signal to begin a down count when a collision is detected. When the count reaches zero, a signal is sent to the isochronous control unit 111 that the system is ready to transmit non-isochronous data. If no isochronous data are to be transmitted for a predetermined period (i.e., longer than the time required for the non-isochronous transmission), the isochronous controller 111 sends a signal to the transmission control 206 to cause retransmission of the data frame.

In addition to receiving signals indicative of the transmission of non-isochronous data, the isochronous controller 111 is configured to supervise transmission of isochronous data onto the bus and reception of isochronous data from the bus. More particularly, the isochronous controller 111 supervises handling of requests for isochronous access. In one embodiment, this includes transmitting requests to the network controller 101. The bus supervisor or network controller 101 then allocates time slots for the transmission and transmits these time slots to the other bus devices. Similarly, the isochronous controller 111 receives such bus requests from other bus devices via the bus supervisor 101. In an alternate embodiment, the isochronous controller 111 is itself the bus supervisor and transmits and receives such bus requests to and from the other bus devices.

If any of the devices on the bus 108 are legacy devices, the isochronous controller 111 according to the present invention additionally is configured to provide a "dummy" frame to the beginning of each isochronous transfer from the bus device. The isochronous controllers of the other bus devices according to the present invention are similarly configured. As discussed above, this "dummy" frame is configured to collide with non-isochronous data attempted to be transmitted from the legacy devices.

Figure 4:
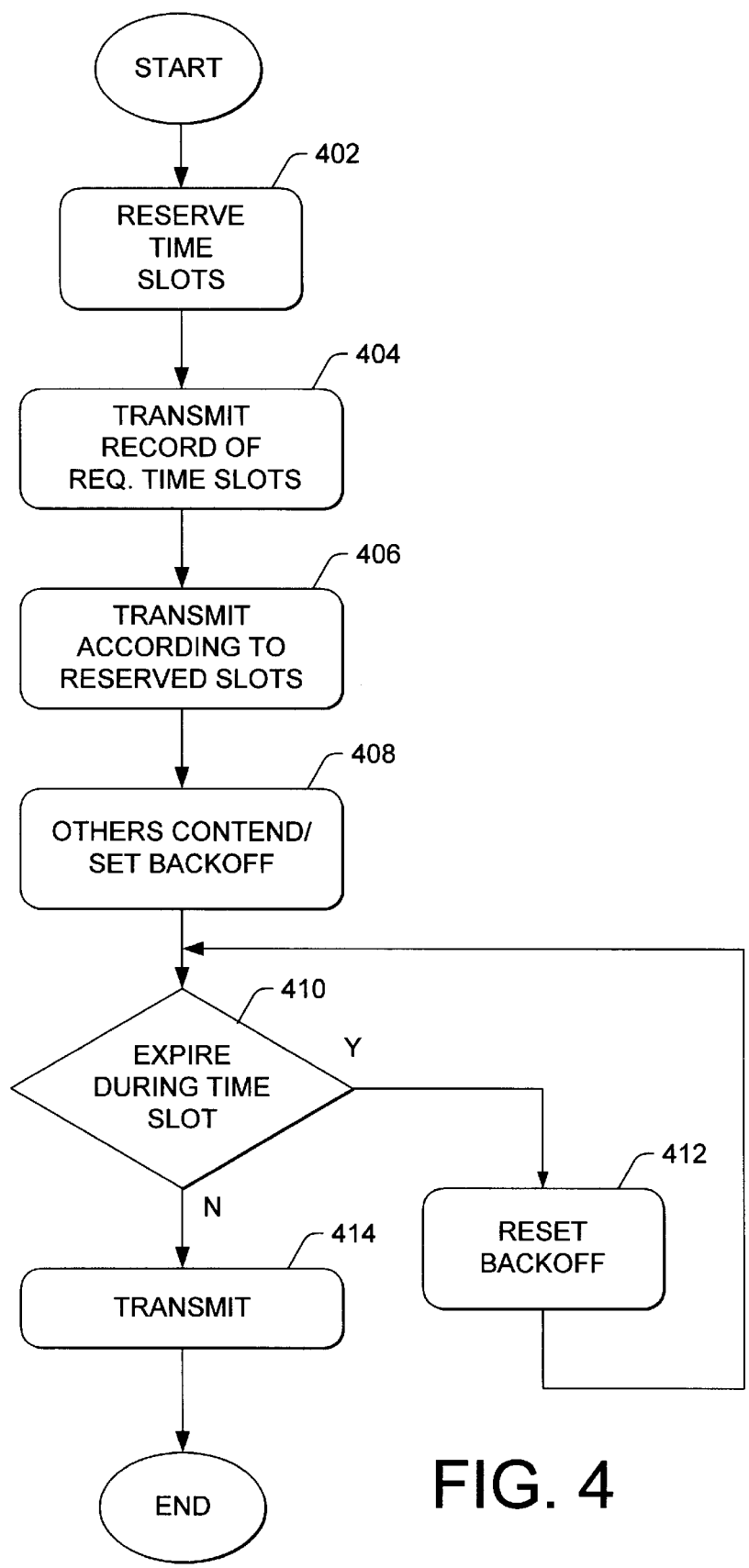
FIG. 4 is a flowchart illustrating a method according to one embodiment of the present invention.

A flowchart illustrating a method 400 according to one embodiment of the present invention is illustrated in FIG. 4. If a voice or video data stream is desired to be transmitted on the bus 102, isochronous controller 111 provides a control signal to network supervisor 101. The isochronous controller 111 in conjunction with the network supervisor thereby reserves a predetermined number of time slots in a step 402. In a step 404, the network supervisor provides a record of these requests to the other bus devices according to the present invention in a step 404. The time periods are thereby reserved for the isochronous transmissions of the requesting device. At the appropriate intervals the requesting device transmits isochronous data frames in a step 406.

The other devices will detect transmissions on the bus and will not attempt access until the frame transmission is finished. At the end of each isochronous frame transmission, the other network devices may contend for bus access for their non-isochronous data in a step 408. As discussed above, this includes providing data onto the bus and waiting for collisions, which are detected by the collision detection unit 118. If the non-isochronous data collides with data from other network devices the collision detection units 118 of the network devices provide an output to the collision counter and suspend transmission along the bus. The collision counter counts every time a collision is detected. If a collision is detected, the random number generator 126 provide inputs to weighting circuit 130 which in turn provides a signal to isochronous controller 111 upon expiration of a backoff window time period. Isochronous controller 111 receives the control signal and compares the expiration of the backoff window to time periods for which isochronous data has reserved bus bandwidth in a step 410. If no isochronous data is to be transmitted for a predetermined period, the non-isochronous transmission is permitted to go forward in a step 414. However, if a backoff window expires during an isochronous time slot, the backoff window is reset in a step 412. As discussed above, this may include adding the remaining time slot time to the backoff window, or causing the backoff window to expire upon the end of the time slot.

Finally, if non-isochronous data is being transmitted when an isochronous data transmission period is set to begin, the isochronous controllers 111 suspend the transmission of the non-isochronous data to allow the isochronous data transmission to go forth.

Figure 5:
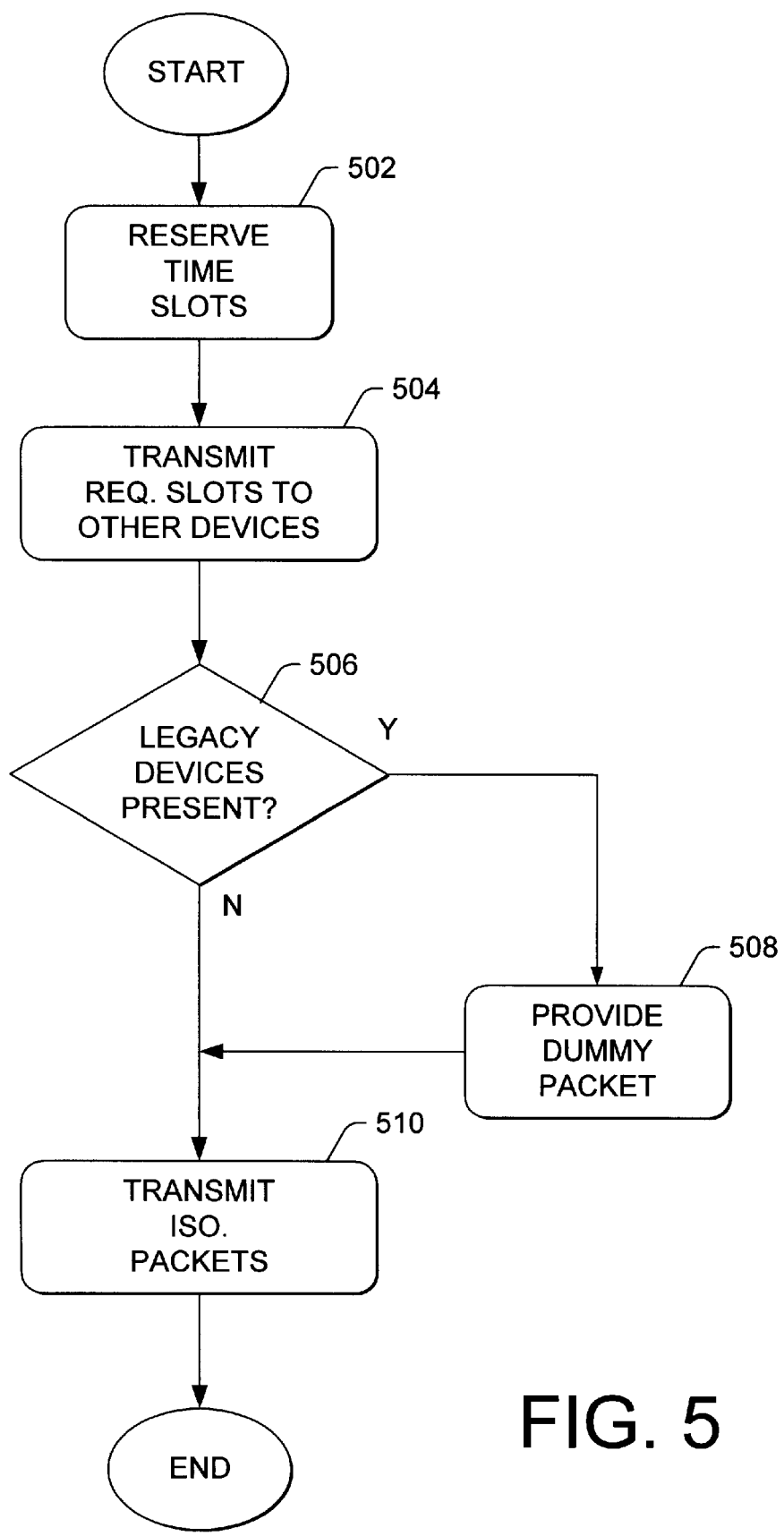
FIG. 5 is a flowchart illustrating a method according to another embodiment of the present invention.

A flowchart illustrating an alternate embodiment of a method according to the present invention is illustrated in FIG. 5. As in the previously described method, a network device initially reserves time slots in a step 502. As discussed above, this may include transmitting a request to a network supervisor 101. In a step 504, the network supervisor 101 or the onboard isochronous controller/network supervisor transmits the reservation information to other network devices. In a step 506 the system may determine whether there are any legacy devices coupled within the network. For example, this information may be provided to the network supervisor 101 upon network configuration; the system makes the determination based upon this configuration information. In alternate embodiments, it may be assumed that there are legacy devices coupled within the network. In either case, in a step 508, the corresponding network devices provide "dummy" isochronous frames at the beginning of each isochronous data transmission. If the legacy device attempts to transmit non-isochronous data on the bus upon the beginning of an isochronous transmission the dummy frame will collide with the frame from the legacy device. The legacy device will then back off and will detect the isochronous transmission. During the isochronous transmission the legacy device will wait; upon expiration of the isochronous transmission the legacy device will again attempt to access the bus in a step 510.

The invention described in the above detailed description is not intended to be limited to the specific form is intended to cover on the contrary, it is intended to cover such alternatives, modifications and equivalents as can reasonably be included within the spirit and scope of the appended claims. For example, while discussed in terms of Ethernet frames, other packet-style networks employing contention protocols are contemplated.

We claim:

1. A method for transmitting isochronous and non-isochronous data in a non-isochronous communication system having a plurality of nodes, comprising:

providing predetermined time frames in said non-isochronous communication system; reserving at least a portion of said predetermined time frames for transmission of isochronous data by at least one of said plurality of nodes that requests a time frame reservation;

sending notification to other nodes in said system of said time frame reservation, wherein said other nodes register said time frame reservation when said nodes have time frame reservation registration capability;

transmitting said isochronous data during said reserved portion of said predetermined time frames; and contending for non-reserved portions of said predetermined time frames for transmission of non-isochronous data.

2. A method according to claim 1, further comprising transmitting a dummy frame immediately before transmitting said isochronous data, wherein said dummy frame transmitting step occurs when at least one of said other nodes do not have time frame reservation registration capability.

3. A method according to claim 1, wherein said contending step comprises contending according to a carrier sense multiple access with collision detection (CSMA/CD) protocol.

4. A method according to claim 3, wherein said contending step includes detecting an end of said reserved portions of said time frames.

5. A method according to claim 4, wherein said contending step includes determining a backoff window upon detecting a collision between data transmitted during a non-reserved time frame.

6. A method according to claim 1, wherein numbers of said predetermined reserved time frames are variable.

7. A method according to claim 1, wherein whether or not said portion of said predetermined time frames are available to be reserved is user-configurable.

8. A network system comprising:

a bus; and a plurality of network devices coupled to said bus, a predetermined number of said plurality of network devices including:

an isochronous controller; and a non-isochronous controller;

wherein said isochronous controller is configured to reserve at least one time slot for said transmission of isochronous data in response to a request made for reservation of at least one time slot, and wherein said isochronous controller is configured to send notification to other network devices of said reservation when said other network devices have time slot reservation registration capability, and wherein said non-isochronous controller is configured to contend for bus access with others of said plurality of network devices during periods other than said time slots for transmission of non-isochronous data.

9. A network system according to claim 8, wherein said non-isochronous controller is configured to contend using a CSMA/CD protocol.

10. A network system according to claim 9, wherein said non-isochronous controller is configured to determine a backoff window if a collision occurs, and is configured to transmit upon expiration of said backoff window.

11. A network system according to claim 10, wherein said isochronous and non-isochronous controllers are configured to reset said backoff window if said backoff window expires during one of said time slots.

12. A network system according to claim 11, wherein said backoff window is reset to include a remaining portion of said time of said one of said time slots.

13. A network system according to claim 12, wherein said backoff window is reset to expire upon an end of said one of said time slots.

14. A network system according to claim 12, wherein said isochronous controller is configured to provide a dummy frame on said bus immediately preceding said time slots.

15. A network system for transmitting isochronous and non-isochronous data in a non-isochronous communication system, comprising:

means for providing predetermined non-isochronous time frames in said non-isochronous communication system; means for requesting a reservation of predetermined numbers of said non-isochronous time frames;

means for sending notification of said reservation to devices in said network system that have reservation registering capability;

means for reserving predetermined numbers of said non-isochronous time frames for transmission of isochronous data; and means for contending for non-reserved non-isochronous time frames for transmission of non-isochronous data.

16. A network system according to claim 15, wherein said contending means includes means for using a carrier sense multiple access with collision detection (CSMA/CD) protocol.

17. A network system according to claim 16, wherein said contending means includes means for detecting an end of said non-isochronous time frames.

18. A network system according to claim 17, wherein said contending means includes means for determining a backoff window upon detecting a collision between data transmitted during nonreserved non-isochronous time frames.

19. A network system according to claim 15, wherein numbers of said reserved time frames are variable.

20. A network system according to claim 15, wherein said contending means includes means for contending with a dummy frame immediately preceding a reserved time frame.

* * * * *